Dec. 9, 1969  E. JONES  3,482,596
METERING VALVE
Filed May 5, 1967
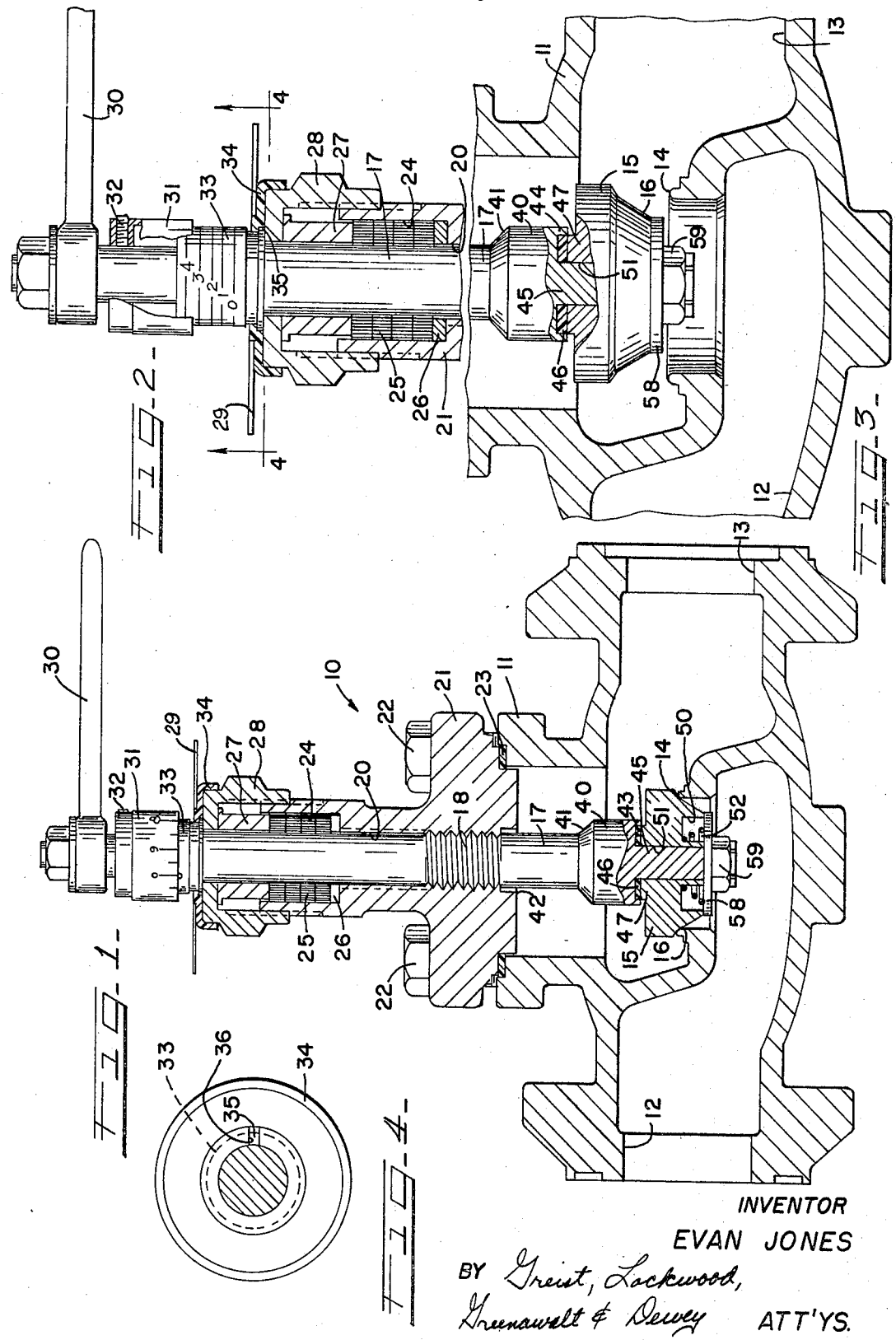
INVENTOR
EVAN JONES
BY Greist, Lockwood,
Grunawalt & Dewey  ATT'YS.

United States Patent Office 3,482,596
Patented Dec. 9, 1969

3,482,596
METERING VALVE
Evan Jones, Evanston, Ill., assignor to Henry Valve Company, Melrose Park, Ill., a corporation of Illinois
Filed May 5, 1967, Ser. No. 636,542
Int. Cl. F16k *1/02, 37/00*
U.S. Cl. 137—556
4 Claims

ABSTRACT OF THE DISCLOSURE

A metering valve in which the metering indicia is readily adjustable to provide for ease of manufacture, assembly, calibration and universal location for easy observation. In globe-type valves, a stem disc in the valve is sealed by a gasket which is confined to permit use of materials having low friction properties.

---

This invention relates to metering valves in general and, more specifically, is directed to improvements in flanged metering valves of the type commonly known as globe valves.

Metering valves of various types are known in the prior art. They are advantageous in that the attendant may open the valve to obtain the desired flow rate. Problems are presented when the rotational motion of the handle is desired to be more than one full turn, as in some valves there is insufficient indicia to permit the valve to be rotated more than one turn. In embodiments which permit full rotation, problems are encountered in calibrating the valve as well as having the indicia located where it can be easily seen. A further problem which has arisen in metering valves is that of the movable seat becoming scored or worn in the area of seating because it oftentimes rotates with the stem as the stem seat or disc is backed away from the seat in the valve body. Broadly speaking, seats which are permitted to rotate relative to the stem are old in art. The present invention, however, provides an improvement over known types in the form of an anti-friction means which virtually assures that relative rotation will not occur at the seating interfaces. This feature is achieved through the provision of a unique sealing ring of a known low friction material which is held within a novelly shaped groove and co-operates with the valve seat to seal the stem disc.

The present invention also includes a novel mounting arrangement for the indicia on the stem and valve body to permit determination of the flow rate at a glance. Moreover, the indicia is uniquely mounted on both the stem and valve body to permit convenient manufacturing, inexpensive assembly and easy calibration when necessary. In addition, rotation of the indicia to any side of the valve is possible, so it may be readily seen regardless of the manner in which the valve is installed. In short, one valve design is applicable for all installations. A better understanding of the present invention may be had on consideration of the objects and advantages achieved.

It is an object of this invention to provide a new and improved metering valve.

It is a further object of this invention to provide a metering valve having a novel indicator means and indicator mounting arrangement which permits the determination of flow rate at a glance.

It is a still further object of his invention to provide a new and improved metering valve which is easily manufactured and calibrated, as well as movable for direct observation from any side of the valve.

It is further object of this invention to provide a new and improved mounting arrangement for indicia on metering valves.

It is a still further object of this invention to provide a new and improved sealing arrangement which provides good sealing and permits free relative rotation between the valve stem and stem disc or seat.

Additional objects other than those set forth will become apparent when reference is made to the accompanying drawings wherein:

FIGURE 1 is a cross-sectional view of a globe valve provided with the features of the present invention and including parts shown in full elevation;

FIGURE 2 is an enlarged cross-sectional view of the valve bonnet and upper portion of the stem, illustrating the stem in a fully opened position;

FIGURE 3 is an enlarged fragmentary cross-sectional view of the lower part of the valve body with the stem shown in the fully opened position and having a part thereof in cross section to illustrate the novel gasket arrangement; and FIGURE 4 is a cross-sectional view taken generally along the line 4—4 of FIGURE 2.

Referring now to FIGURE 1, the metering valve 10 includes a valve body 11, having an inlet opening 12 and outlet 13. Formed within the valve body 11 is a fixed valve seat 14 which is disposed between the inlet and outlet openings in axial opposition to a stem disc 15 provided with a stem seat portion 16. The stem disc 15 is carried on the lower end of a valve stem 17 having threads 18 which are interfitted with internal threads 20 formed in a valve bonnet 21. The stem disc 15 is of a frusto-conical shape and partially receivable within the valve seat 14 when the disc 15 is in the fully closed position. Therefore, the increase in flow through the valve when the stem disc 15 is retracted by rotating the stem 17 will be substantially uniform for each unit of rotation of the stem 17. The valve bonnet 21 is attached to the valve body 11 by means of bolts 22 or the equivalent with a gasket 23 interposed to maintain fluid-tight integrity.

The upper end of the valve bonnet 21 is formed with a counterbored portion 24 coaxial with the threads 20 and into which is fitted a plurality of packing rings 25 formed of distortable material such as rubber, plastic or the like. At the lower end of the packing chamber 24 is provided a steel packing washer 26 which prevents the packing 25 from extruding along the stem 17 into the threaded bore 20 in the bonnet 21. A packing gland 27 engages the outermost packing and operates to apply pressure to compress the packing, with the force being generated by a packing nut 28 which is threadably interfitted with the upper end of the bonnet 21 in a conventional manner. As is well known in the art, the axial pressure applied through the gland 27 must be adjusted from time to time to compensate for the wear in the packing 25 and prevent leakage along the stem, such being accomplished by rotating the packing nut 28.

The upper end of the stem extends from the bonnet 21 and receives an operating handle 30 of any desired type. Immediately beneath the handle 30, the stem 17 receives pitch indicator label means in the form of a collar 31 which is held to the stem by a set screw 32. The collar 31 includes numbers formed thereon in the manner of a micrometer indicator. A stationary bushing 33 is loosely disposed about the stem 17 and has the upper end positioned within the movable collar 31. As seen in FIGURE 2, it is also provided with indicia which co-operates with the collar 31 to identify the number and fractional number of turns. The rate of flow can be calibrated and carried on a name plate 29 on the collar 34.

The bushing 33 is held against rotation by an elastomeric collar 34, frictionally fitted over the packing nut 28 which, as previously pointed out, is mounted on the valve bonnet 21. As seen in FIGURE 4, the elastomeric collar 34 is provided with a tongue 35 which is interfitted within a groove 36 in the bushing 33 to prevent relative rotation between the collar 34 and bushing 33.

In use, as the packing nut 28 is adjusted from time to time, the metering indicia may be readily recalibrated by simply removing the elastomeric collar 34 and realigning the zero on the collar 31 when the valve is fully closed. In the initial installations of the valve, the collar 31 and the bushing 33 may be rotated to a position where the numbers on the collar 31 and on the bushing 33 may be easily seen. This makes the single valve design universally applicable for all installations.

Referring now to FIGURES 1 and 3, the lower part of the stem is formed with an enlarged cylindrical portion 40 which merges with the upper portion of reduced diameter through a frusto-conical portion 41 adapted to back seat on the annular shoulder 42 on the bonnet 21 for packing replacement, failure or the like. The enlarged cylindrical portion 40 is provided at its lower end with an axially facing groove 43 bordered on the outer periphery by an annular rib 44, while the niner periphery is defined by an axial extension 45 of the stem 17 which is of reduced diameter. Mounted within the axially facing groove is a packing 46 of low friction material formed of a fluorocarbon such as Teflon or the like. As is well known, the properties of such low friction materials are excellent to prevent sticking between relatively movable surfaces, such as between the bottom of the groove 43 and a boss 47 formed on the top of the stem disc 15, the latter being sized so as to have a diameter slightly less than the inside diameter of the shoulder 44. Because of this relation, the boss 47 can maintain the gasket 46 held in confined relation in an axial direction while the ridge 44 around the outer periphery prevents the gasket from extruding outwardly as is a common problem with low friction materials which are usually subject to cold flow.

The stem disc 15 is also provided with an axially opening groove 50 at its lower end and a coaxial bore 51 which is received around the section 45 of reduced diameter of the stem 17 with a bearing fit. The stem disc 15 is biased against the gasket 46 by a spiral spring 52 which has the large end resting against a washer 58 which is held on the stem 17 by a lock nut 59. The spring 52 operates to hold the boss 47 tightly against the gasket 46, maintaining it in a confined state at all times during movement of the valve stem. The washer 58 prevents chattering of the valve by its outer margin engaging the stem disc 15, since the gasket 46 is substantially incompressible, and the washer 58 provides positive engagement between the axial extension 45 of the stem 17 and the stem disc 15.

From the foregoing, it can be appreciated that the metering valve of the present invention provides advantages not found in known types of metering valves. The packing may be readily adjusted and the collar 31 and co-operating bushing 33 easily moved to a zero position. Where movement of the packing nut is slight, the elastomeric collar 34 may be easily released from the packing nut and the zero position moved to coincide with the zero on the collar 31. Should the packing nut be adjusted to a degree where it is necessary to readjust the axial position of the collar 31 relative to the bushing 33, the set screw 32 may be released and its elevational height adjusted relative to the indicator bushing 33. When the valve body is mounted in the field, the indicators may be moved to the exposed side of the valve body. This frequently occurs when the valve is located against a wall or in a similar location in which it may be observed from one side only.

Confining the gasket 46 in tahe groove permits a material of an extremely low friction to be used, thus enhancing the sealing effect and the freedom of rotation between the stem disc 15 and the stem 17 for longevity of the seats. The additional advantage of using materials of this type is that they are not subject to attack by corrosive fluids which oftentimes cause valve failure.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A metering valve comprising, in combination, a valve body, a threaded stem having a disc thereon, said disc being movable away from engagement with a seat form in said valve body to a retracted position whereby full flow through the valve is permitted, a collar mounted on said stem for reciprocal movement relative to said valve body when said stem is rotated, said collar having a position indicator thereon, an elastomeric collar surrounding a portion of said valve body and being urged into releasable gripping engagement therewith, and an indicia-containing bushing carried on a portion of said valve body, said bushing being held fixedly in relation to said elastomeric collar and co-operating with said indicator to visually indicate the position of said disc relative to said valve seat and thereby indicate the degree to which said valve is open.

2. The metering valve of claim 1 wherein a tongue is provided on said elastomeric collar and wherein a groove is provided on said bushing for cooperation with said tongue to hold said bushing against rotation relative to said elastomeric collar.

3. The metering valve of claim 1 wherein means is provided for mounting said disc for rotation relative to said valve stem, said means including seal means formed from low friction material, wherein means are provided for biasing said disc against said seal means to maintain it in a position of confinement, and wherein said disc includes means for confining said seal means around its outer periphery to prevent extrusion of said seal means from between said disc and said stem.

4. A metering valve comprising, in combination, a valve body having a valve seat therein, a threaded rotatable stem extending into an inner portion of said body, a disc disposed on the inner end portion of said stem for movement into and out of engagement with said valve seat when said stem is rotated, means for mounting said disc for rotation relative to said valve stem, said means including seal means formed from low friction material, means for biasing said disc against said seal, means on said disc for at least partially confining said seal, and means on said stem for confining said seal around the outer periphery thereof to prevent extrusion of said seal means from between said disc and said stem, means having a position indicator thereon disposed on the outer portion of said stem, and second position indicating means surrounding said stem and being fixed in relation to said body for use with said indicator means on said stem to indicate the position of said valve disc.

References Cited
UNITED STATES PATENTS

| 664,368 | 12/1900 | Grosse et al. | 251—88 |
| 2,514,025 | 7/1950 | Bush | 137—556.6 |

HENRY T. KLINKSIEK, Primary Examiner

U.S. Cl. X.R.

251—88